Dec. 15, 1936.   J. KUCHAR   2,064,615
DRAFT APPLIANCE
Filed Sept. 26, 1930    3 Sheets-Sheet 3

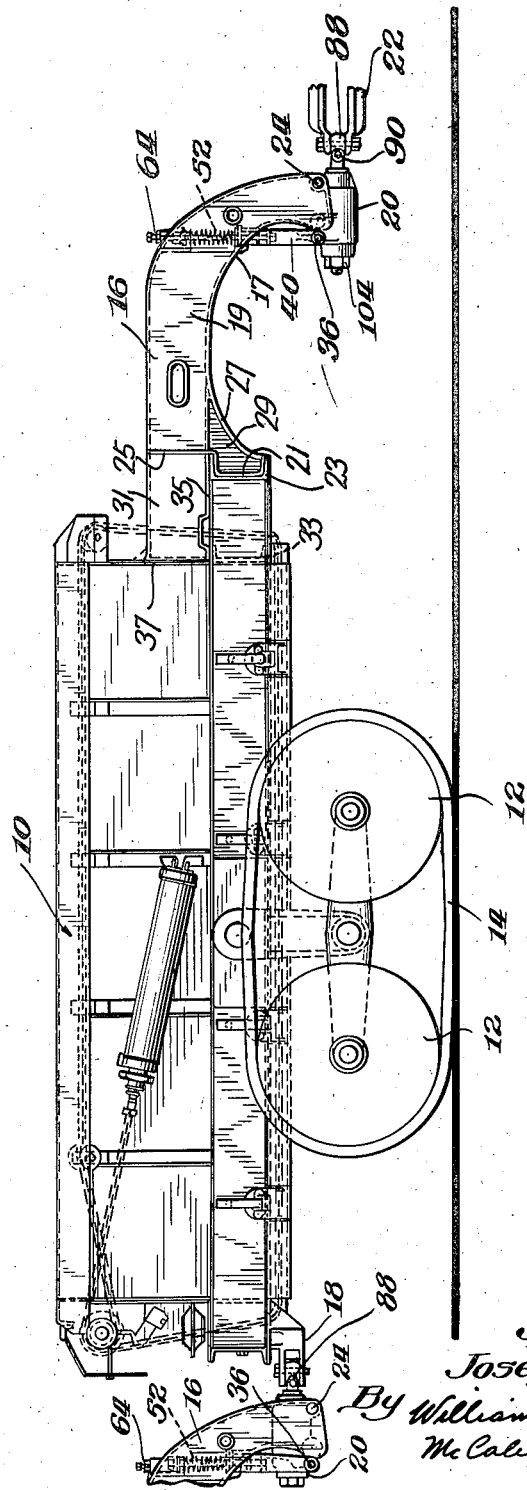

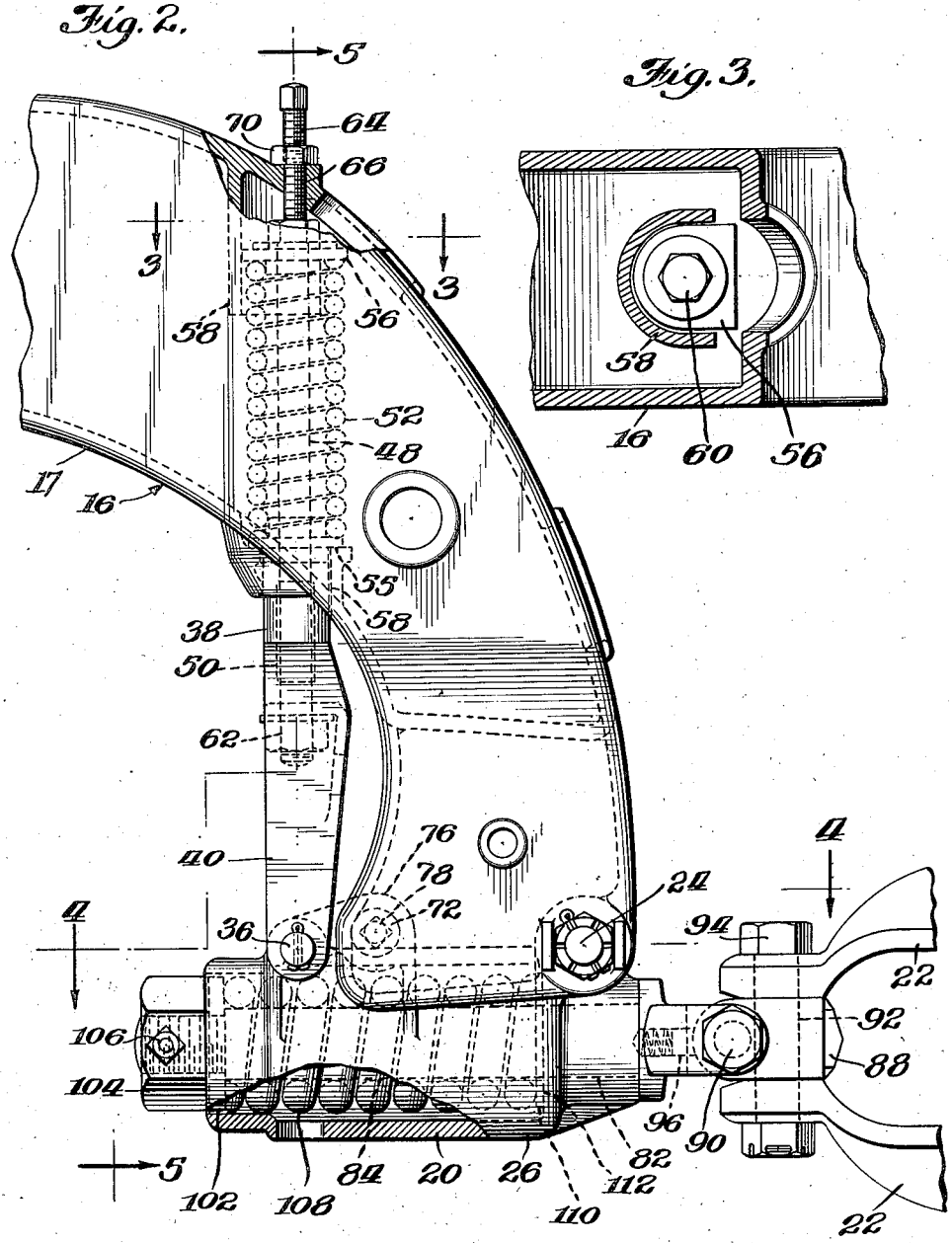
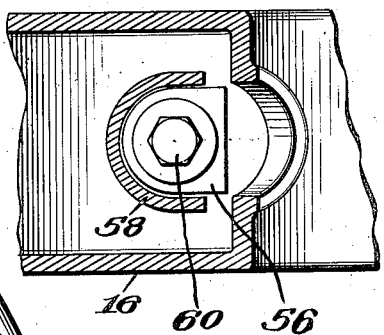

Inventor
Joseph Kuchar
By Williams, Bradbury
McCaleb & Hinkle Attys.

Patented Dec. 15, 1936

2,064,615

UNITED STATES PATENT OFFICE 2,064,615

DRAFT APPLIANCE

Joseph Kuchar, Chicago, Ill., assignor to Athey Truss Wheel Co., Chicago, Ill., a corporation of Illinois Application September 26, 1930, Serial No. 484,623

4 Claims. (Cl. 280—33.44)

My invention relates to drawbar brackets for vehicles and the manner in which they are mounted, and is more particularly concerned with a drawbar bracket of this type that may be adjusted to different heights.

An object of my invention is to provide a novel drawbar or draft appliance for use in combination with a rigid drawbar that forms a part of the frame of a heavy vehicle chassis.

A further object of the present invention is to provide a novel drawbar or draft appliance that may be inverted and connected to the rigid drawbar forming a part of the frame of a heavier vehicle chassis at a plurality of different heights.

A further object of my invention is to provide a new and improved appliance of this type incorporating shock absorbing mechanism yieldable longitudinally when the drawing force of a tractor or other power traction device is applied thereto and yieldable vertically to absorb loading and road shocks. The longitudinally yielding means allows the traction device to gain momentum and prevents severe stresses and strains in the drawn vehicle which would otherwise be produced by sudden jerking action of the tractor. The vertically yielding shock absorbing mechanism allows for smoothness of drawbar pull as the various loaded vehicles are drawn by the tractor over a comparatively rough road. It obviously improves the riding quality of the drawn vehicle over one that is rigidly attached to a tractor.

My invention particularly relates to rigid drawbars of vehicle chassis having a gooseneck or arch-neck formation, and my invention further resides in the novel arrangement of parts and the details of construction all of which are described in the following specification and illustrated in the accompanying drawings, in which:

Figure 1 is a side elevational view of a typical dump wagon provided with a gooseneck or arch-neck type of drawbar bracket and illustrating the draft appliance of the present invention as being the attaching means between the front end of the wagon and a tractor at a comparatively low level, and further illustrating my improved draft appliance at the rear of the wagon as the connection to another wagon, this draft appliance being shown at a higher level.

Figure 2 is an enlarged elevational view of a portion of the gooseneck drawbar shown in Fig. 1, with the improved draft appliance of my invention connected thereto, portions being broken away in section to more clearly show other portions.

Figure 3 is a fragmentary plan sectional view taken on the line 3—3 of Fig. 2, looking in the direction of the arrows.

Figure 4:
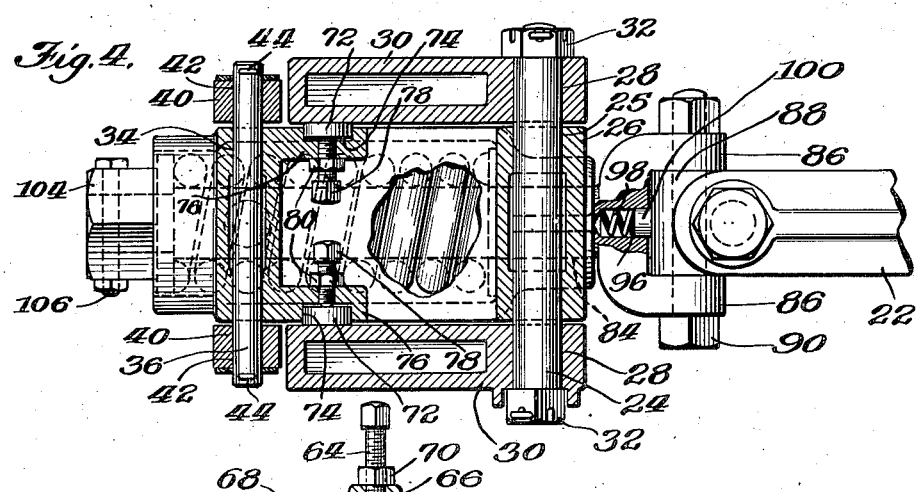
Figure 4 is a plan sectional view through the mechanism, taken generally on the line 4—4 of Fig. 2.
Figure 5:
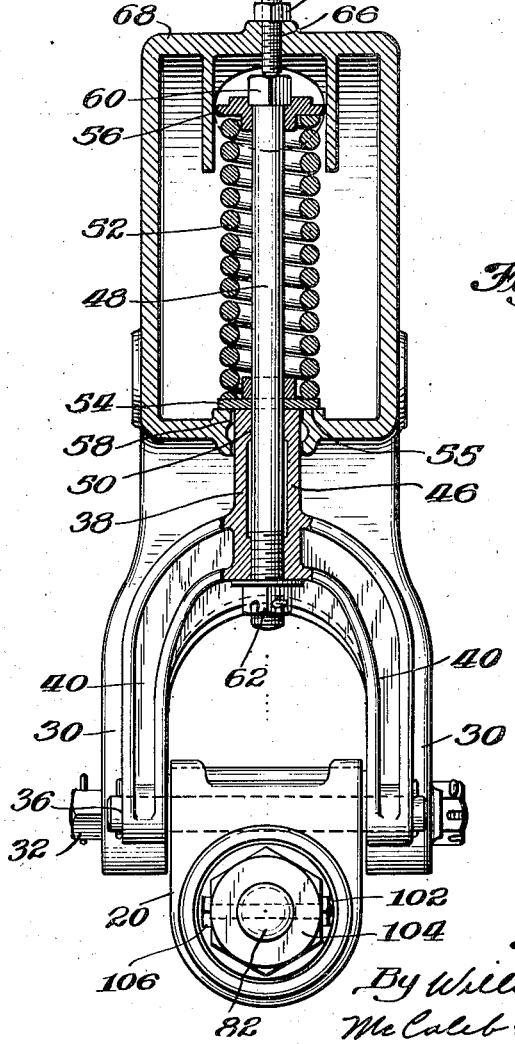
Figure 5 is a vertical sectional view through the portion of the gooseneck drawbar to which my improved draft appliance is applied, and an end elevational view of my improved draft appliance, the view being taken generally on the line 5—5 of Fig. 2.

Referring to the drawings (Fig. 1), I have shown a dump wagon trailer 10 mounted upon the running gear of the self-laying track type in which a pair of wheels 12 roll on an endless chain 14. A running gear of this type is disclosed in the patent to I. H. Athey, No. 1,435,788, of November 14, 1922. The trailer 10 is provided with the usual type of framework and is also provided at its front end with a rigid gooseneck or arch-neck type drawbar 16. At its rear end the trailer is further provided with a bracket 18 adapted to engage with a draft appliance 20 connected to the rigid drawbar 16 of another trailer 10 attached behind the first trailer. The first trailer is connected to a tractor or other power mechanism through the medium of a similar draft appliance 20 and a clevis 22 which may be a part of the tractor. The draft appliance 20 is pivotally connected to drawbar 16 upon the pivot bolt 24 which passes through a suitable opening 25 in the housing 26 of the draft appliance and through suitable openings 28 in the lower end of drawbar 16. The openings 28 are formed in the forked ends 30 of the drawbar, which are adapted to straddle the housing 26 of the draft appliance 20. Pivot pin 24 is provided with suitable lock nuts 32 at opposite ends to effectively secure the pivot pin in position. Housing 26 of the draft appliance is further provided with a similar opening 34 at its rearward end through which a second pivot or yoke pin 36 is positioned. A yoke member 38 having arms 40 is pivotally secured to the pin 36, the arms 40 having suitable openings 42 through which the pin 36 passes. Pin 36 may be secured against removal by a pair of cotter pins 44 which extend through the pin at each end. The yoke 38 which is pivotally connected to the rear end of the draft appliance 20 has a hub portion 46. A bolt 48 is provided, having a shank extending through a suitable bore 50 in hub portion 46 of the yoke 38. A comparatively heavy coil spring 52 is arranged on said bolt, being positioned between a thrust washer 54 which rests against the edge 55 of an opening 58 through the lower wall of drawbar 16 and a suitable thrust or guide member 56 which rests against the head of bolt 48. The hub 46 of yoke 38 and the bolt 48 extend up into the interior of the drawbar 16 through the opening 58 in the lower wall thereof. The drawbar 16 at this point is in the form of a hollow rectangular casting of the desired shape. A suitable wall portion 58 extends downwardly from the upper wall and forms a housing to enclose the guide and thrust member 56 to prevent the same from turning. The guide or thrust member 56 has a seat for engaging the head 60 of the bolt 48 so the bolt will be held against turning in the wall portion 58 of the drawbar 16. To adjust the compression force of the spring 52, the nut 62 at the lower end of bolt 48 is tightened or loosened as desired, and to lock the spring 52 under the desired tension a set screw 64 is provided extending downward through a suitably tapped bore 66 in the upper wall 68 of the drawbar 16. A suitable lock nut 70 is provided to lock the set screw 64 in its desired position.

From the foregoing description it will be apparent that a construction has been provided wherein the draft appliance 20 is pivotally secured to the forward end of the drawbar 16 and through the medium of yoke 40 and bolt 48, it is yieldingly secured at its rearward end to the drawbar 16. In this manner, vertical shocks obtained as a load is drawn over a comparatively rough road are absorbed.

Wearing blocks 72 are provided between the housing 26 and the inner walls of the forked ends 30 of the drawbar. These wearing blocks may be in the form of discs suitably housed in the cavities 74 in the sides of flanges 76 struck up from the housing 26. Suitable set screws 78 provided with lock nuts 80 pass through appropriate tapped holes in the flanges 76 and bear against the wearing blocks 72 to hold them in frictional engaging position with the arms 30. In this manner any possible wear between the housing 26 and the arms 30 is avoided, being taken by the wearing block 72 which may readily be replaced when they are worn out.

Means for connecting the draft appliance to the clevis 22 of a tractor will now be described. The forward end of the draft element is provided with the bore 82, through which is snugly fitted a bolt 84 which is adapted to have relative longitudinal movement with respect to the draft element 20. The front end of the bolt 84 is bifurcated, having the two ears 86 adapted to receive therebetween a coupler member 88 which is held in place by a bolt 90. The coupler 88 has an opening 92 therethrough through which is fitted a bolt 94 which secures the clevis 22 in position so that it may transmit force from any power traction appliance to the draw bolt 84.

A cylindrical bore 96 is formed in the front end of bolt 84 and has therein a coil spring 98 which is seated against the bottom of the bore and against a cylindrical block 100 which is forced thereby into contacting engagement with the rear side of the coupler 88 for resisting its free movement, but permitting movement thereof when sufficient force is applied. The purpose of this arrangement is particularly to aid in the coupling of the draft appliance to the tractor or other traction mechanism, in that it will support the coupler 88 in any placed position from which it would otherwise drop by gravity unless yieldingly held by the block 96.

The end of bolt 84 extends longitudinally through the hollow interior of housing 26 and is provided at its rear end with a washer 102 and a nut 104. The nut 104 is securely locked in position on the bolt 84 by a suitable bolt and nut 106. A relatively heavy coil spring 108 is placed upon the bolt 84 between the washer 102 and a washer 110 adapted to rest against a shoulder 112 formed in the forward end of housing 26. The coil spring 108 is adapted to yieldingly restrain forward longitudinal movement of the bolt 84 when traction force is applied to the same, thus tending to produce a smooth pulling movement as the trailer is being drawn forward.

Thus far the draft appliance has been illustrated and described with reference to its arrangement for attachment to the clevis of a tractor. However, when it is desired to bring the coupler 88 to a height to connect, for example, with the bracket 18 at the rear end of another trailer 10, the pivot pin 36 and the pivot bolt 24 are both removed. The draft appliance 20 is inverted, the housing having suitable clearance within the arms 30 of the drawbar 16 and also within the arms 40 of the yoke member 38. The pin 36 and the pivot bolt 24 are replaced with the draft appliance 20 in an inverted position and the coupler 88 will be positioned a substantial distance higher than in its former position.

As can readily be seen, it is a very simple matter to invert the draft appliance 20 to provide a coupler at a different height, the entire operation requiring a very short amount of time. The drawbar 16 comprises a hollow casting of substantially rectangular cross section. Its forward portion is arched downwardly with an even curve, the rear face of the upper part of the arched portion being sloped downwardly and forwardly as indicated at 17. The intermediate portion 19 of the drawbar 16, that is, the portion to the rear of the downwardly arched forward part of the drawbar, is preferably straight and is provided short of its rear end with a main attachment plate 21. This main attachment plate 21 is below the main length 19 of the drawbar 16, so as to bring this plate into alignment with the draft as far as possible. The attachment plate 21 is relatively wide and is secured by bolts (not shown) or other suitable attaching means to the main frame of the wagon. In the wagon illustrated the main frame includes a channel member 23 at its forward end and the attachment plate 21 is formed to seat within the channel. It will be understood that where different frame elements are used the plate 21 is preferably shaped to conform thereto.

The attachment plate 21 is integral with the drawbar 16 and is secured to the main horizontal portion 19 thereof by suitable webs. The upper edge of the attachment plate 21 is united to the sides of the intermediate portion 19 of the drawbar by means of lateral flanges 25 which are preferably of triangular shape. The lower edge of the attachment plate 21 is secured to the underside of the horizontal portion 19 of the drawbar by means of a web 27 of curved form as shown in Fig. 1. This web merges into the underface of the horizontal intermediate portion 19 of the drawbar 16, and in conjunction with the inner face 17, forms a complete arch which will clear the wheel of a tractor on making short turns. A web 29 integral with the drawbar and substantially triangular in shape connects the plate 21, web 27 and the underside of the main portion 19 of the drawbar together. The drawbar 16 comprises a tail piece 31 which projects rearwardly beyond the attachment plate 21 and is firmly anchored to the wagon to prevent any tendency of the forward end of the drawbar to be moved relatively to the wagon under extreme lateral pulls. This tail piece 31 may be bolted to the main frame member 23, to other frame members 33, to a reinforcing plate 35, or to the wagon wall 37 as desired. The tail piece 31, the intermediate portion 19 of the drawbar 16, and the downwardly extending forward portion are in the form of a hollow body which, except from the forward extremity, is substantially rectangular in cross-section. This extremity is bifurcated, as has been previously noted, in order to accommodate the draft appliance 20.

While I have illustrated and described only a single embodiment of my invention, it will be understood by those familiar with the art that numerous changes and modifications may be made in the details of construction and I do not wish to limit myself to the embodiment shown, rather, what I desire to secure by United States Letters Patent is:

1. A one-piece, integral casting to be used as a draft appliance for use in connecting leading vehicles with tractors, trailers, or succeeding trailers, comprising an integral fully arched tongue part, and an integral attaching frame at the butt end thereof, an integral depending hitch bar at the forward end of said tongue having means substantially in line with the draft for attaching a coupling, and means below the normal draft line for attaching another coupling, the inner face of said hitch bar being sloped down and forwardly, and curved at its upper part to be symmetrical with the curve of the under part of the tongue, said tongue and hitch bar being integral.

2. A one-piece, integral casting to be used as an arched draft appliance comprising a tongue having an attaching frame at its butt end, and a forward depending hitch bar, the inner or rear face of the upper portion of the depending hitch bar being sloped downwardly and forwardly and being curved into the under face of the tongue in symmetrical outline, said casting and its several above-named parts being of hollow, rectangular construction in cross-section.

3. A one-piece, integral casting to be used as a draft appliance for use in connecting leading vehicles with tractors, trailers, or succeeding trailers, comprising an integral arched tongue part and an integral attaching frame at the butt end thereof, said tongue having a depending portion at the forward end, and means carried thereby for attaching a coupling, the inner face of the upper part of said depending portion being sloped down and forwardly and curved at its upper part to be symmetrical with the curve of the under part of the tongue, said tongue, attaching frame and downwardly extending portion being in the form of a continuous hollow casting of rectangular section.

4. A one-piece, integral casting to be used as an arched draft appliance, comprising a hollow tongue of rectangular cross-section which extends longitudinally and has a downwardly extending portion at its forward end, and an attaching frame at its rear end, the downwardly extending portion of the tongue being connected to the main horizontal portion thereof by a gradual curved or arched portion, the inner or rear face of the upper part of said arched portion being sloped downwardly and forwardly and being curved into the under face of the main portion of the tongue, and means adjacent the bottom of the downwardly extending portion for connecting a vehicle thereto.

JOSEPH KUCHAR.